United States Patent
Feldman et al.

(10) Patent No.: US 9,432,708 B1
(45) Date of Patent: Aug. 30, 2016

(54) SYSTEM AND METHOD FOR AUTOMATICALLY DETERMINING LATENCY OF COMPONENTS IN A VIDEO SYSTEM AND SYNCHRONIZING COMPONENTS

(71) Applicant: Disney Enterprises, Inc., Burbank, CA (US)

(72) Inventors: Vladislav Feldman, Manhasset Hills, NY (US); Reinaldo Jimenez, Cary, NC (US); Efthimis Stefanidis, Douglaston, NY (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

(21) Appl. No.: 14/717,906

(22) Filed: May 20, 2015

(51) Int. Cl.
*H04N 21/242* (2011.01)
*H04N 21/43* (2011.01)
*H04N 21/6543* (2011.01)

(52) U.S. Cl.
CPC ........ *H04N 21/242* (2013.01); *H04N 21/4302* (2013.01); *H04N 21/6543* (2013.01)

(58) Field of Classification Search
CPC ........... H04N 21/242; H04N 21/4302; H04N 21/6543
USPC ............ 725/42, 62, 116; 370/241, 316, 498, 370/503, 508, 517; 455/502, 517; 348/53, 348/180, 273; 709/203
See application file for complete search history.

(56) References Cited

U.S. PATENT DOCUMENTS

| | | | |
|---|---|---|---|
| 7,190,703 B1 * | 3/2007 | Heitmann | H04M 7/0066 370/508 |
| 7,787,576 B2 * | 8/2010 | Foerster | G01R 13/0254 370/498 |
| 2002/0107040 A1 * | 8/2002 | Crandall | H04L 29/06 455/517 |
| 2011/0019558 A1 * | 1/2011 | Rowe | H04L 43/0858 370/252 |
| 2012/0124606 A1 * | 5/2012 | Tidwell | H04N 21/25833 725/17 |
| 2014/0053214 A1 * | 2/2014 | Walker | H04N 21/2343 725/62 |

OTHER PUBLICATIONS

A.H. Ghamarian, "Latency Minimization for Sunchronous Data Flow Graphs", 2007, IEEE.*
D. Stopp Ixia, B.Hickman, Methodology for IP Multicast Benchmarking, Oct. 2004, Networking Group, Spirent Communications.*
S. Bradner and J. McQuaid, "Benchmarking Methodology for Network Interconnect Devices", Mar. 1999, Network Working group.*

* cited by examiner

*Primary Examiner* — Brian T Pendleton
*Assistant Examiner* — Alan Luong
(74) *Attorney, Agent, or Firm* — Farjami & Farjami LLP

(57) ABSTRACT

There is provided a system and method for determining the latency of components of a video system comprising a video latency determination device. The video latency determination device includes a memory and a processor configured to detect a test video pattern appearing at a known time in the video signal at the video output of each component, calculate the latency of each component based on the known time of the test video pattern and the time at which the video latency determination device detects the test video pattern, and store the latency of each component in the memory.

20 Claims, 4 Drawing Sheets

SYSTEM AND METHOD FOR AUTOMATICALLY DETERMINING LATENCY OF COMPONENTS IN A VIDEO SYSTEM AND SYNCHRONIZING COMPONENTS

BACKGROUND

In a typical video broadcast system, a control system typically executes a timed schedule and controls multiple components for video playback and video switching. Each component of the video system has an inherent latency, which is an amount of time it takes for a given component to receive and process a command from the control system to output a video. For example, if a video switcher has a latency of 20 ms to switch to a video source, e.g. a video feed from a video file server, and the video file server has a latency of 5 ms to provide the video feed to the video switcher, the first 15 ms of the video will be lost due to the latencies introduced by the video file server and the video switcher if the control system does not take the latencies into account by issuing a command 15 ms prior to the desired video output.

SUMMARY

The present disclosure is directed to systems and methods for determining a latency for each of a plurality of components in a video system and synchronizing the components according to the latencies, substantially as shown in and/or described in connection with at least one of the figures, as set forth more completely in the claims.

DETAILED DESCRIPTION

Figure 1:
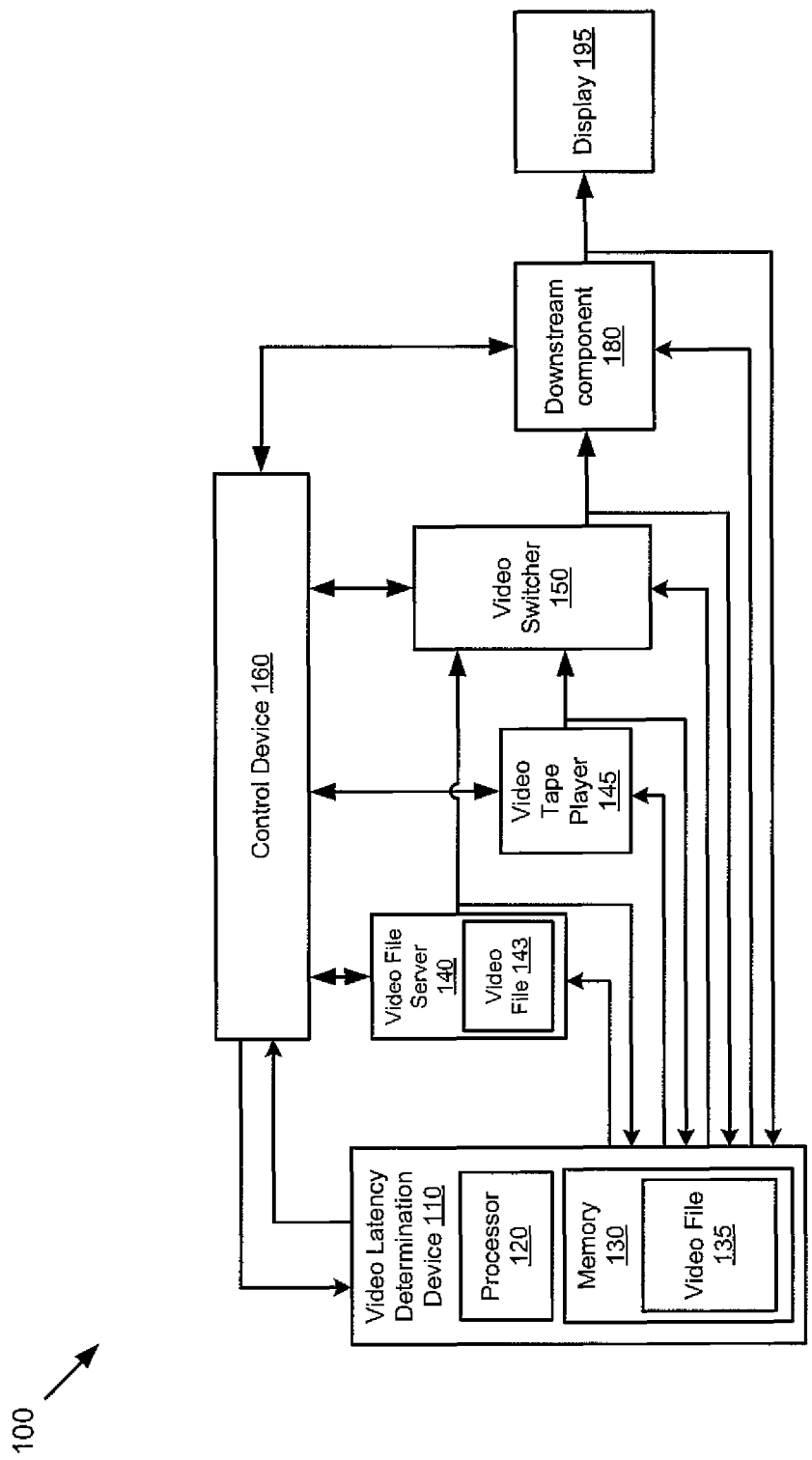
FIG. 1 shows a diagram of an exemplary video system, according to one implementation of the present disclosure.

The following description contains specific information pertaining to implementations in the present disclosure. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

FIG. 1 shows a diagram of an exemplary video system, according to one implementation of the present disclosure. As shown in FIG. 1, video system 100 includes video latency determination device 110, video file server 140, video switcher 150, and may also include video tape player 145, control device 160, and downstream component 180.

Video latency determination device 110 includes processor 120 and memory 130, which includes video file 135. Processor 120 may access memory 130 to store received input or to execute commands, processes, or programs stored in memory 130. Processor 120 may be a microprocessor or a similar hardware processor used in a computing device. Memory 130 is a non-transitory storage device capable of storing data, commands, processes, and programs for execution by processor 120. Video file 135 includes a test video pattern for use by video latency determination device 110. The test video pattern may include a video signal comprising a gray screen including a black box in the center, or the test video pattern may include data, tags, or signals inserted into an ancillary space of a video signal, such as a vertical blanking interval.

Video latency determination device 110 may be connected to each of a plurality of components for issuing commands or control signals. Video latency determination device 110 may also be connected to a video input and a video output of video switcher 150. Video latency determination device 110 may be connected to control device 160, and receive instructions and commands from control device 160. Video system 100 may use video latency determination device 110 to determine the command-to-action time or the latency associated with each component of video system 100.

Video file server 140 includes a processor and a memory (not shown) for storing video file 143, and includes one or more video outputs. Video file 143 includes a test video pattern, and may be connected to video latency determination device 110 and control device 160. The test video pattern may include a video signal comprising a gray screen including a black box in the center, or the test video pattern may include data, tags, or signals inserted into an ancillary space of a video signal, such as a vertical blanking interval. Video file server 140 may transmit the test video pattern for detection by video latency determination device 110 at the one or more video outputs of the video file server 140.

Video tape player 145 may be a tape player suitable for playing a videotape, and includes one or more video outputs. As shown in FIG. 1, video tape player 145 may be connected to video latency determination device 110 and control device 160. Video tape player 145 may play a video tape including a test video pattern, and may transmit a video signal including the test video pattern for detection by video latency determination device 110. The test video pattern may include a video signal comprising a gray screen including a black box in the center, or the test video pattern may include data, tags, or signals inserted into an ancillary space of a video signal, such as a vertical blanking interval.

Video switcher 150 includes one or more video inputs and one or more video outputs. As shown in FIG. 1, the one or more video inputs of video switcher 150 may be connected to video latency determination device 110, video file server 140, and video tape player 145. In some implementations, video switcher 150 may receive a video input signal and/or a control signal from video latency determination device 110. Video switcher 150 may also receive a video input signal from video file server 140 or video tape player 145. In some implementations, video switcher 150 may receive a control signal from control device 160. Video switcher 150 is configured to switch between its video inputs to create a seamless video output on one or more of its video outputs by performing frame accurate switches between a first video input and a second video input and providing same on one of its video outputs. In some implementations, video switcher 150 may a video content on a plurality of its video outputs channels. In some implementations, video switcher 150 may transmit different video signals on different ones of its video outputs.

Control device 160 includes one or more control signal outputs for controlling video file server 140, video tape player 145, video switcher 150 and downstream component 180 by sending control signals or instructions. In some implementations, control device 160 may also control video latency determination device 110. For example, control device 160 may be connected to video file server 140 and may send a control signal to video file server 140 instructing video file server 140 to begin playing a video at a first video play time. In order to play the video file at the video play time, control device 160 may send the control signal to video file server 140 at the first video play time less the video file server latency.

In some implementations, control device 160 may be connected to video switcher 150 and send a control signal to video switcher 150 instructing video switcher 150 to switch to a first video input at a first video play time. In order for video switcher 150 to switch to the input at the first video play time, control device 160 may send the control signal to video switcher 150 at the first video play time less the video switcher latency. In some implementations, control device 160 may send a control signal to video latency determination device 110 for instructing video file server 140 to transmit a video signal using video file 143 having the test video pattern, where the test video pattern starts at the video pattern start time in video file 143. In some implementations, control device 160 may send a control signal to video latency determination device 110 for instructing video switcher 150 to switch to an input channel for receiving the video signal from video file server 140.

Control device 160 may be configured to receive various inputs from a user, such as the video filer server latency, the video switcher latency and the video tape player latency. In some implementations, video latency determination device 110 automatically provides the video file server latency, the video switcher latency and the video tape player latency, as parameters for use by control device 160. In some implementations, control device 160 may use the video file server latency and the video switcher latency, as parameters to synchronize video file server 140 and video switcher 150, such that video file server 140 outputs a video signal to a video input of video switcher 150 upon video switcher 150 switching to that video input.

Downstream component 180 may include a video component that adds an overlay or an effect to a transmitted video signal after the transmitted video signal is output by video switcher 150. In some implementations, downstream component 180 includes one or more video inputs and one or more video outputs. Downstream component 180 may be connected to video latency determination device 110 and control device 160.

Display 195 may be a graphic display suitable for showing a video content, such as a computer monitor, a television, etc. In some implementations, display 195 receives a video signal from video switcher 150 or downstream component 180 and displays the video signal.

Figure 2:
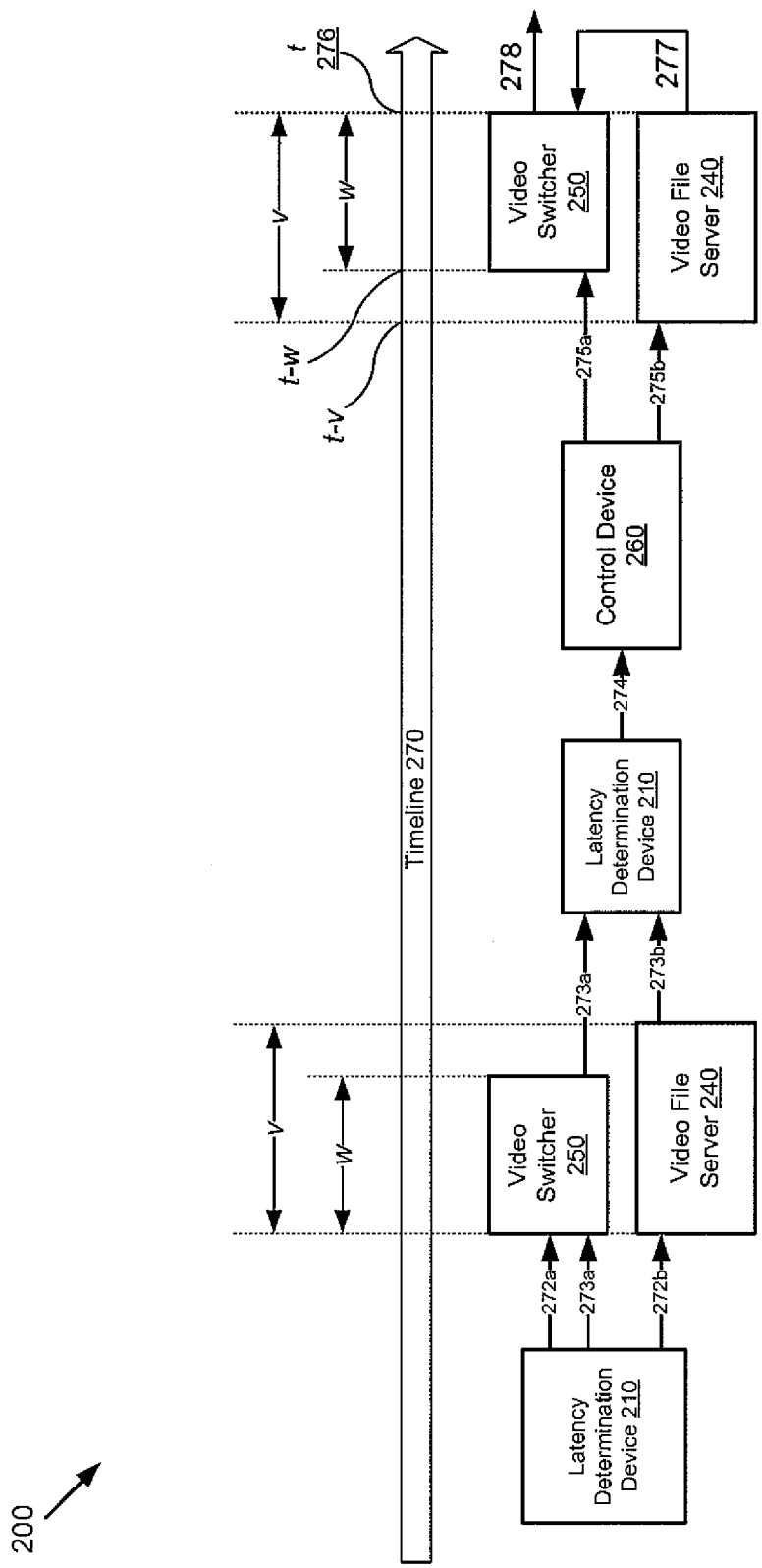
FIG. 2 shows an exemplary flow diagram of a process for use by the video system of FIG. 1, according to one implementation of the present disclosure.

FIG. 2 shows an exemplary flow diagram of a process for use by the video system of FIG. 1. Flow diagram 200 depicts a process of determining the video file server latency and the video switcher latency, and using the determined latencies to achieve a seamless video switching at time t 276. FIG. 2 depicts timeline 270 according to an internal clock of video system 100.

At a first time, video latency determination device 210 transmits first control signal 272b to video file server 240 instructing video file server 240 to transmit a first video signal, including a first test video pattern, generated from a first video file stored in video file server 240. The first test video pattern may start at a first video pattern start time, which is a known amount of time after the beginning of the first video signal. Also at the first time or a different time, video latency determination device 210 may transmit second control signal 272a and also second video signal 273a, including a second test video pattern, generated from a second video file stored in video latency determination device 210, to video switcher 250. The second test video pattern may be start at a second video pattern start time, which is a known amount of time after the beginning of second video signal 273a. Second control signal 272a instructs video switcher 250 to switch to a first video input for receiving the second video signal from video latency determination device 210.

In response to first control signal 272b, video file server 240 transmits first video signal 273b, and video latency determination device 210 detects the first test video pattern in first video signal 273b at a first detected time. Video latency determination device 210 then calculates the video file server latency (v) by subtracting the first time and the first video pattern start time from the first detected time. In some implementations, the first time may be assigned a zero value, simplifying the calculation so that the video file server latency is the first detected time minus the first video pattern start time.

In response to second control signal 272a, video switcher 250 switches to the first video input for receiving second video signal 273a from video latency determination device 210 and outputs second video signal 273a at a first video output. Latency determination device 210 detects the second test video pattern in second video signal 273a outputted by video switcher 250 at a second detected time. Video latency determination device 210 then calculates the video switcher latency (w) by subtracting the first time and the second video pattern start time from the second detected time. In some implementations, the first time may be assigned a zero value, simplifying the calculation so that the video switcher latency is the second detected time minus the second video pattern start time.

As shown in FIG. 2, video latency determination device 210 sends the video switcher latency and the video file server latency to control device 260 via signal 274. In some implementations, control device 260 receives the video switcher latency and the video file server latency as input parameters manually entered by a user. After receiving the video switcher latency and the video file server latency, control device 260 sends control signal 275a to video switcher 250 at time t less the video switcher latency w, and sends control signal 275b to video file server 240 at time t less the video file server latency v. In response to receiving control signal 275b at time t less the video file server latency v, video file server 240 outputs video signal 277 to video switcher at time t. In response to receiving control signal 275a at time t less the video file server latency w, video switcher 250 is ready to receive video signal 277 from video switcher at time t and output video signal 277 as video signal 278.

Figure 3:
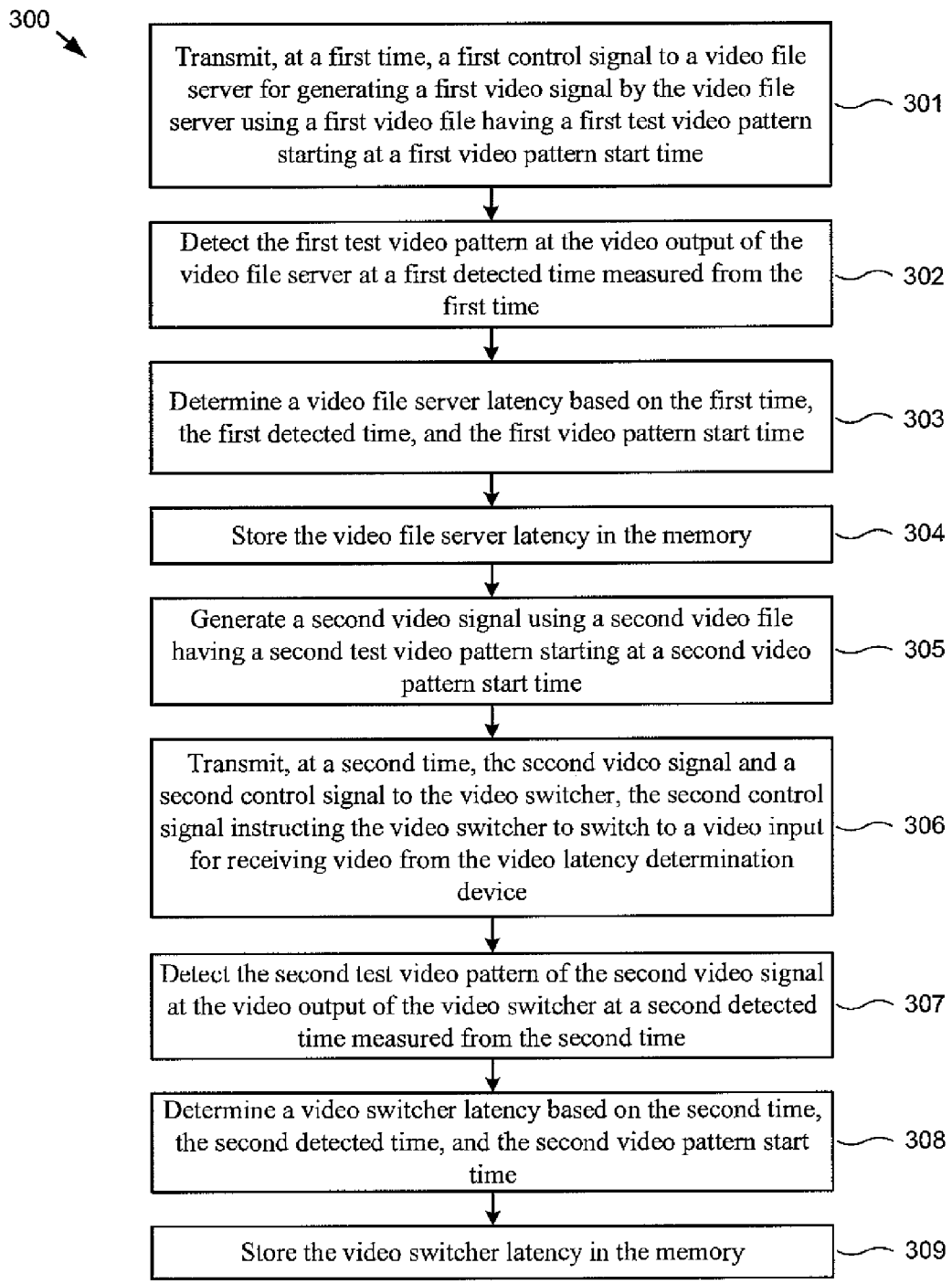
FIG. 3 shows an exemplary flowchart illustrating a method of determining a latency for each component of the video system of FIG. 1, according to one implementation of the present disclosure.

FIG. 3 shows exemplary flowchart 300 illustrating a method of determining the latency of components of a video system, according to one implementation of the present disclosure.

At 301, video latency determination device 110 transmits, at a first time, a first control signal to video file server 140 for generating a first video signal using a first video file having a first test video pattern starting at a first video pattern start time. The first test video pattern may be included as an image or a series of images of the first video signal, or, in the case of an active video, as a bit pattern inserted in the auxiliary data field of the first video signal. For example, the first test video pattern may be included in the vertical blanking interval of the first video signal. The first video pattern start time may be a time occurring at a fixed amount of time after the beginning of the first video signal. For example, if the first video signal includes a video having 59.94 frames per second (fps), and the first test video pattern begins five frames after the beginning of the first video signal, the first video pattern start time would be 83.4 milliseconds.

At 302, video latency determination device 110 detects the first test video pattern at the video output of video file server 140 at a first detected time measured from the first time. In some implementations, the first time may be measured in reference to an internal clock of video latency determination system 100.

At 303, video latency determination device 110 determines a video file server latency based on the first time, the first detected time, and the first video pattern start time. To determine the video file server latency, video latency determination device 110 subtracts the first time and the first video pattern start time from the first detected time. In some implementations, the first time may be set equal to zero, simplifying the calculation so that the video file server latency is the difference between the first detected time and the first video pattern start time. For example, if the first detected time is 500 ms and the first video pattern start time is 208 ms, the video file server latency would be 292 ms.

At 304, video latency determination device 110 stores the video file server latency in a memory. In some implementations, video latency determination device 110 may store video file server latency in a local memory, such as memory 130. In some implementations, video latency determination device 110 may send video file server latency to control device 160.

At 305, video latency determination device 110 generates a second video signal using a second video file having a second test video pattern starting at a second video pattern start time. The second test video pattern may be included as an image or a series of images of the second video signal, or, in the case of an active video, as a bit pattern inserted in the auxiliary data field of the second video signal. For example, the second test video pattern may be included in the vertical blanking interval of the second video signal. The second video pattern start time may be a time occurring a fixed amount of time after the beginning of the second video signal.

At 306, video latency determination device 110 transmits, at a second time, the second video signal and a second control signal to video switcher 150, the second control signal instructing video switcher 150 to switch to a video input for receiving the second video signal from video latency determination device 110. In some implementations, the second time may be the same as the first time, or the second time may be a time before or after the first time.

At 307, video latency determination device 110 detects the second test video pattern of the second video signal at the video output of video switcher 150 at a second detected time. In some implementations, the second time may be measured in reference to an internal clock of video latency determination system 100.

At 308, video latency determination device 110 determines a video switcher latency based on the second time, the second detected time, and the second video pattern start time. To determine the video switcher latency, video latency determination device 110 subtracts the second time and the second video pattern start time from the second detected time. In some implementations, the second time may be set equal to zero, simplifying the calculation so that the video switcher latency is the difference between the second detected time and the second video pattern start time. For example, if the second detected time is 600 ms and the second video pattern start time is 208 ms, the video switcher latency would be 392 ms.

At 309, video latency determination device 110 stores the video switcher latency in a memory. In some implementations, video latency determination device 110 may store video switcher latency in a local memory, such as memory 130. In some implementations, video latency determination device 110 may send video switcher latency to control device 160.

In some implementations, video latency determination device 110 may not include video file 135. To determine the video switcher latency, video latency determination device 110 may send a control signal to both video file server 140 and video switcher 150 at the same time. The control signal may instruct video file server 140 to generate a video signal using video file 143 including a test video pattern starting at a video pattern start time, and output the video signal from a first video output of video file server 140 to a first video input of video switcher 150. Video file server 140, in response to the control signal, may out the video signal including the test video pattern from the first video output of video file server 140 to the first video input of video switcher 150. The control signal may instruct video switcher 150 to switch to the first video input for receiving the video signal from the first video output of video file server 140 and output the video signal at the first video output of video switcher 150. Video latency determination device 110 may detect the test video pattern at the first video output of video file server 140 and calculate the video file server latency, as explained above in conjunction with FIG. 3. To calculate the video switcher latency, video latency determination device 110 may detect the test video pattern at the first video output of video switcher 150. Video latency determination device 110 may calculate the video switcher latency by subtracting the video file server latency and the video pattern start time from the time at which the test video pattern was detected at the first video output of video switcher 150.

Figure 4:
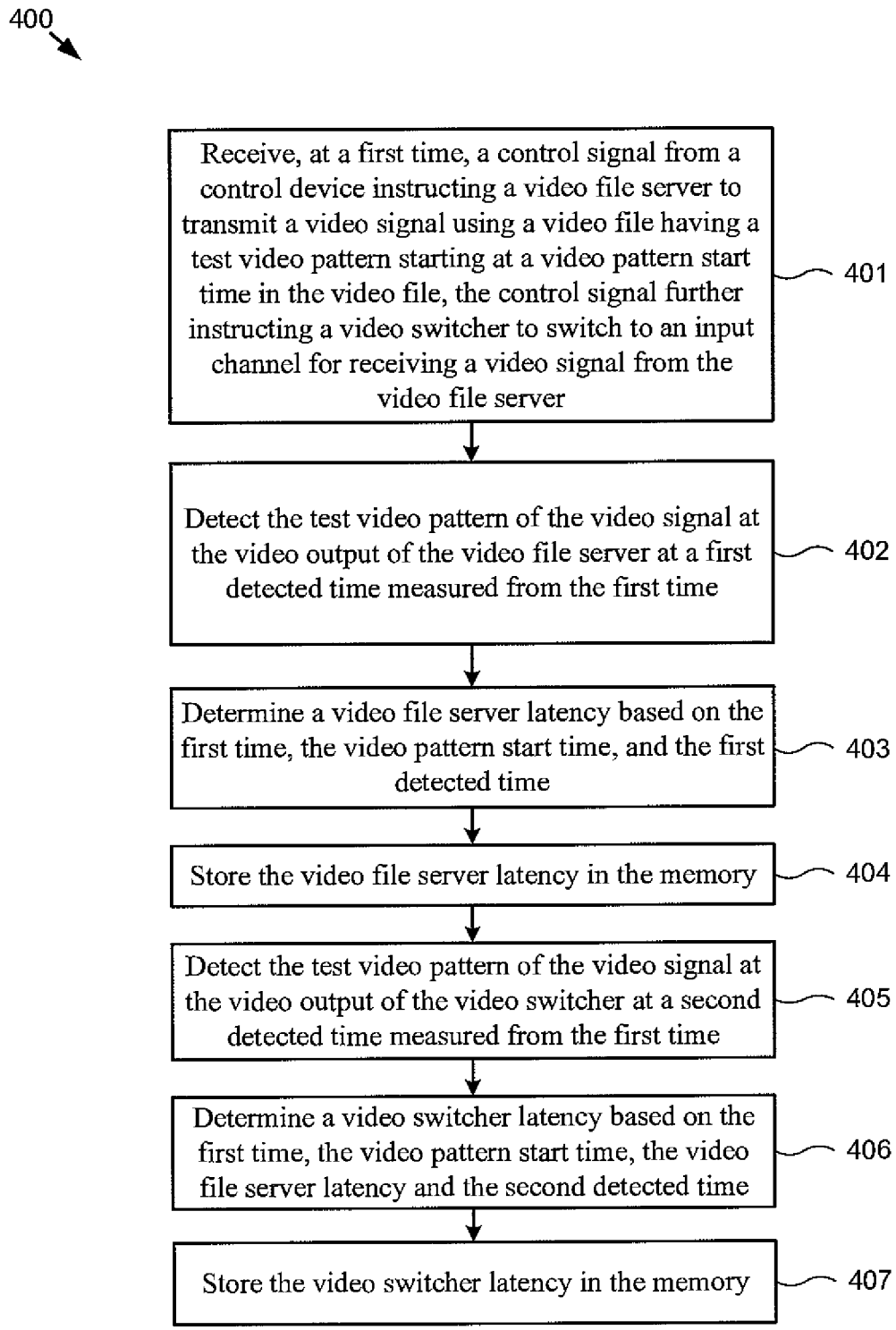
FIG. 4 shows an exemplary flowchart illustrating a method of determining a latency for each component of the video system of FIG. 1, according to one implementation of the present disclosure.

FIG. 4 shows exemplary flowchart 400 illustrating a method of determining the latency of components of a video system, according to one implementation of the present disclosure.

At 401, video latency determination device 110 receives, at a first time, a control signal from control device 160 instructing video file server 140 to transmit a video signal, at a first video output of video file server 140, generated from video file 143 having the test video pattern starting at a video pattern start time in video file 143, the control signal further instructing video switcher 150 to switch to first video input for receiving the video signal from video file server 140, and transmit the video signal from a first video out of video switcher 150.

At 402, video latency determination device 110 detects the test video pattern of the video signal at the first video output of video file server 140 at a first detected time measured from the first time.

At 403, video latency determination device 110 determines a video file server latency based on the first time, the video pattern start time, and the first detected time, e.g., as discussed above in conjunction with FIG. 3.

At 404, video latency determination device 110 stores the video file server latency in a memory. In some implementations, video latency determination device 110 may store video file server latency in a local memory, such as memory 130. In some implementations, video latency determination device 110 may send video file server latency to playback control device 160.

At 405, video latency determination device 110 detects the test video pattern of the video signal at the first video output of video switcher 150 at a second detected time measured from the first time.

At 406, video latency determination device 110 determines a video switcher latency based on the first time, the video pattern start time, the video file server latency and the second detected time.

At 407, video latency determination device 110 stores the video switcher latency in a memory. In some implementations, video latency determination device 110 may store video switcher latency in a local memory, such as memory 130. In some implementations, video latency determination device 110 may send video switcher latency to playback control device 160.

From the above description, it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described above, but many rearrangements, modifications, and substitutions are possible without departing from the scope of the present disclosure.

What is claimed is:

1. A video latency determination device for use in a video system and for connection to a video output of each of a video file server and a video switcher of the video system, the video file server including a video file having a test video pattern starting at a video pattern start time in the video file, the video system also including a control device for controlling the video file server and the video switcher, and the control device being in communication with the video latency determination device, the video latency determination device comprising:
   a memory; and
   a processor configured to:
      receive, at a first time, a control signal from the control device instructing the video file server to transmit a video signal using the video file having the test video pattern starting at the video pattern start time in the video file, the control signal further instructing the video switcher to switch to the video input of the video switcher for receiving the video signal from the video output of the video file server and outputting the video signal from the video output of the video switcher;
      detect, in response to the control signal, the test video pattern of the video signal at the video output of the video file server at a first detected time measured from the first time;
      determine a video file server latency based on the first time, the video pattern start time, and the first detected time;
      store the video file server latency in the memory;
      detect the test video pattern of the video signal at the video output of the video switcher at a second detected time measured from the first time;
      determine a video switcher latency based on the first time, the video pattern start time, the video file server latency and the second detected time; and
      store the video switcher latency in the memory.

2. The video latency determination device of claim 1, wherein the control device instructs the video file server to begin playing a video at a video play time less the video file server latency, and instructs the video switcher to switch to the video input of the video switcher at the video play time less the video switcher latency.

3. A video latency determination device for use in a video system and for connection to a video output of a video file server and a video input and a video output of video switcher of the video system, the video file server including a first video file having a first test video pattern starting at a first video pattern start time in the first video file, the video latency determination device comprising:
   a memory including a second video file having a second test video pattern starting at a second video pattern start time in the second video file; and
   a processor configured to:
      transmit, at a first time, a first control signal to the video file server for generating a first video signal, by the video file server, using the first video file having the first test video pattern starting at the first video pattern start time;
      detect, in response to the first control signal, the first test video pattern at the video output of the video file server at a first detected time measured from the first time;
      determine a video file server latency based on the first time, the first detected time, and the first video pattern start time;
      store the video file server latency in the memory;
      generate a second video signal using the second video file having the second test video pattern starting at the second video pattern start time;
      transmit, at a second time, the second video signal and a second control signal to the video switcher, the second control signal instructing the video switcher to switch to the video input of the video switcher for receiving the second video signal from the video latency determination device;
      detect, in response to the second control signal, the second test video pattern of the second video signal at the video output of the video switcher at a second detected time measured from the second time;
      determine a video switcher latency based on the second time, the second detected time, and the second video pattern start time; and
      store the video switcher latency in the memory.

4. The video latency determination device of claim 3, wherein the video system further comprises a control device controlling the video file server and the video switcher to play a video at a video play time, wherein the video output of the video file server is coupled to the video input of the video switcher, and wherein the control device instructs the video file server to begin playing the video at the video play time less the video file server latency, and instructs the video switcher to switch to the video input of the video switcher at the video play time less the video switcher latency.

5. The video latency determination device of claim 4, wherein the video file server latency and the video switcher latency are entered by a user as parameters for use by the control device to synchronize the video file server and the video switcher.

6. The video latency determination device of claim 4, wherein the video latency determination device automatically provides the video file server latency and the video switcher latency as parameters for use by the control device.

7. The video latency determination device of claim 3, wherein the video file server latency and video switcher latency are frame accurate.

8. The video latency determination device of claim 3, wherein the first time and the second time are measured in reference to an internal clock of the video latency determination system.

9. The video latency determination device of claim 3, wherein the test video pattern is inserted into an auxiliary data field of the video signal.

10. The video latency determination device of claim 3, wherein the test video pattern is an image included in the video signal.

11. The video latency determination device of claim 3, wherein the video latency determination system is connectable to a video output of a video tape player, wherein the processor is configured to:
   transmit, at a third time, a third control signal to the video tape player for generating a third video signal, by the video tape player, playing a video tape, the third video signal including a third test video pattern stalling at a third video pattern start time;
   detect the third test video pattern of the third video signal at the video output of the video tape player at a third detected time measured from the third time;
   determine a video tape player latency based on the third time, the third detected time, and the third video pattern start time; and
   store the video tape player latency in the memory.

12. A method for use by a video latency determination device in a video system, the video latency determination device having a memory and a processor, and the video latency determination device being connected to a video output of a video file server and a video input and a video output of a video switcher of the video system, the video file server including a first video file having a first test video pattern starting at a first video pattern start time in the first video file, the memory of the video latency determination device including a second video file having a second test video pattern starting at a second video pattern start time in the second video file, the method including:
   transmitting, using the processor at a first time, a first control signal to the video file server for generating a first video signal by the video file server using the first video file having the first test video pattern starting at the first video pattern start time;
   detecting, using the processor, in response to the first control signal, the first test video pattern at the video output of the video file server at a first detected time measured from the first time;
   determining, using the processor, a video file server latency based on the first time, the first detected time, and the first video pattern start time;
   storing the video file server latency in the memory;
   generating, using the processor, a second video signal using the second video file having the second test video pattern starting at the second video pattern start time;
   transmitting, using the processor at a second time, the second video signal and a second control signal to the video switcher, the second control signal instructing the video switcher to switch to the video input for receiving the second video signal from the video latency determination device;
   detecting, using the processor, in response to the second control signal, the second test video pattern of the second video signal at the video output of the video switcher at a second detected time measured from the second time;
   determining, using the processor, a video switcher latency based on the second time, the second detected time, and the second video pattern start time; and
   storing the video switcher latency in the memory.

13. The method of claim 12, wherein the system further comprises a control device for controlling the video file server and the video switcher to play a video at a video play time, wherein the video output of the video file server is coupled to the video input of the video switcher, the method further comprising:
   sending, using the control device, a first instruction to the video file server to begin playing the video at the video play time less the video file server latency; and
   sending, using the control device, a second instruction to the video switcher to switch to the video input of the video switcher at the video play time less the video switcher latency.

14. The method of claim 13, wherein the video file server latency and the video switcher latency are entered by a user as parameters for use by the control device.

15. The method of claim 13, wherein the latency determination system automatically provides the video file server latency and the video switcher latency as parameters for use by the control device.

16. The method of claim 12, wherein the video file server latency and video switcher latency are frame accurate.

17. The method of claim 12, wherein the first time and the second time are measured in reference to an internal clock of the video latency determination system.

18. The method of claim 12, wherein the test video pattern is inserted into an auxiliary data field of the video signal.

19. The method of claim 12, wherein the test video pattern is an image included in the video signal.

20. The method of claim 12, wherein the video latency determination system is further connectable to a video output of a video tape player, the method further comprising:
   transmitting, using the processor at a third time, a third control signal to the video tape player for generating a third video signal by the video tape player playing a video tape, the third video signal including a third test video pattern starting at a third video pattern start time;
   detecting, using the processor, the third test video pattern of the third video signal at the video output of the video tape player at a third detected time measured nom the third time;
   determining, using the processor, a video tape player latency based on the third time, the third detected time, and the third video pattern start time; and
   storing the video tape player latency in the memory.

* * * * *